Aug. 13, 1957   J. BARCAFER   2,802,612
VEHICLE CARRIER
Filed March 16, 1956   2 Sheets-Sheet 2
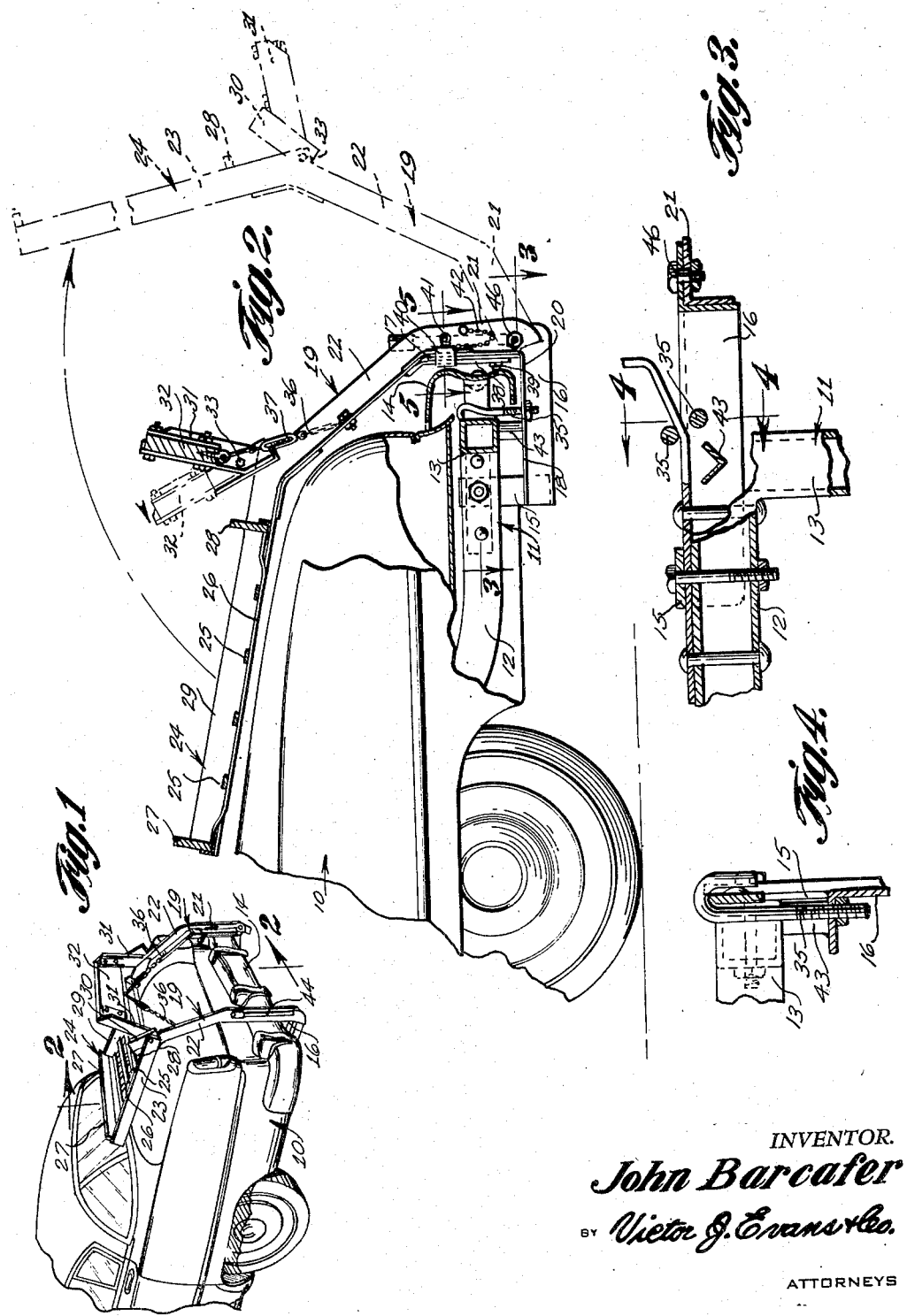
INVENTOR.
John Barcafer
BY Victor J. Evans & Co.
ATTORNEYS

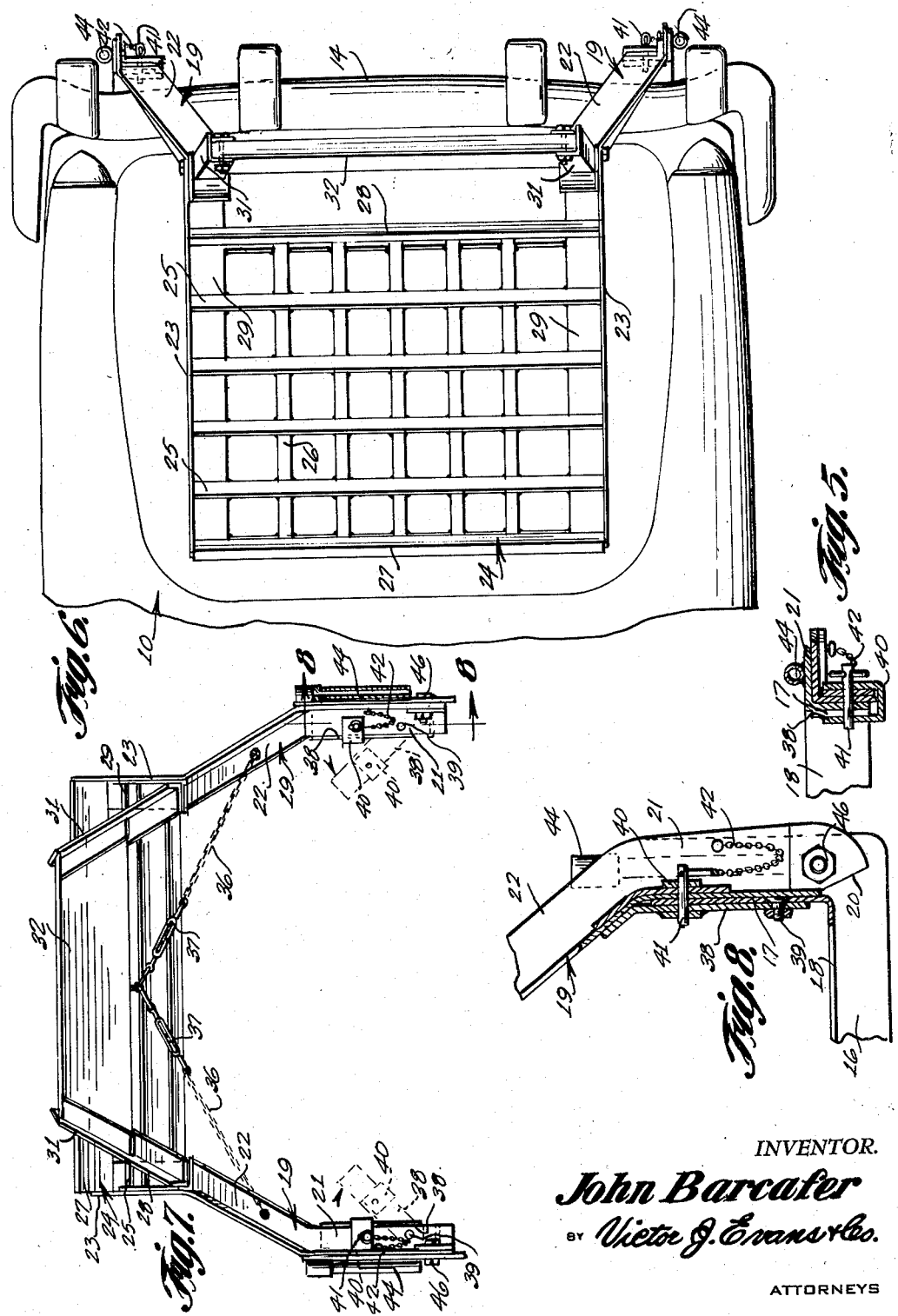

United States Patent Office 2,802,612
Patented Aug. 13, 1957

2,802,612

VEHICLE CARRIER

John Barcafer, Shattuck, Okla.

Application March 16, 1956, Serial No. 572,007

5 Claims. (Cl. 224—42.08)

This invention relates to a vehicle such as an automobile, and more particularly to a load supporting mechanism for attachment to a vehicle.

The object of the invention is to provide a load supporting carrier for attachment to the rear of a vehicle such as an automobile whereby loads such as luggage, outboard motors or the like can be readily transported.

Another object of the invention is to provide a luggage carrier which can be readily attached to the rear of a vehicle such as an automobile whereby there is provided a means for transporting additional baggage or equipment, the mechanism being installed on the automobile without requiring any material alterations or rearrangement to the vehicle, and wherein the mechanism can be removed from the vehicle when desired.

A further object of the invention is to provide a vehicle luggage carrier which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a fragmentary perspective view of a vehicle such as an automobile, showing the carrier of the present invention mounted thereon.

Figure 2 is a sectional view taken on the line 2—2 of Figure 1.

Figure 3 is a sectional view taken on the line 3—3 of Figure 2.

Figure 4 is a sectional view taken on the line 4—4 of Figure 3.

Figure 5 is a sectional view taken on the line 5—5 of Figure 2.

Figure 6 is a fragmentary top plan view of a vehicle showing the present invention mounted thereon.

Figure 7 is an end elevational view of the carrier showing the carrier detached from the vehicle.

Figure 8 is a sectional view taken on the line 8—8 of Figure 7.

Referring in detail to the drawings, the numeral 10 designates a portion of a conventional vehicle such as an automobile, and the vehicle 10 includes the usual frame 11 which may comprise side sections 12 and an end section or portion 13, of conventional construction. There is further provided the usual rear bumper 14.

The present invention is directed to an apparatus for use in transporting or carrying loads such as luggage, baggage, outboard motors or the like whereby the vehicle 10 can be used for transporting such additional baggage or loads without interfering with the normal operation or use of the vehicle.

The mechanism of the present invention includes a pair of spaced parallel vertically disposed bars 15 which depend from the frame 11 and are secured thereto in any suitable manner, as for example by welding or by means of bolt and nut assemblies. Extending rearwardly from each of the bars 15 is an arm 16, and the arm 16 may be secured to the bars 15 as by welding. The rear end of each of the arms 16 terminates in an upstanding finger 17 for a purpose to be later described, and the upper edge of the arm 16 may be provided with a horizontally disposed flange 18, Figure 8.

There is further provided a pair of pivotally mounted support members 19 which each have the same construction, and the lower portion of each of the support members 19 is shaped to provide a shoulder 20. The shoulders 20 are adapted to abut the flanges 18 so as to limit outward swinging movement of the support members 19. Each of the support members 19 includes a first lower portion 21 and a second portion 22 and a third portion 23, and the portions 21, 22 and 23 are arranged angularly with respect to each other. Also, the third portions 23 extend inwardly towards each other as shown in Figure 7. Carried by the upper ends of the support members 19 is a frame 24 which includes a first set of spaced parallel strips 25, and a second set of spaced parallel strips 26. The strips 25 and 26 are arranged at right angles with respect to each other and may be secured together as by welding. The frame 24 further includes spaced parallel end walls 27 and 28, and spaced parallel side walls 29.

Secured to each of the support members 19 is a lip 30, and a brace 31 may be pivotally connected to each of the lips 30 through the medium of a pivot pin or bolt 33. A backboard 32 extends between the pair of braces 31 and is secured thereto. The backboard 32 is adapted to have mounted thereon a conventional outboard motor as when it is desired to transport such an outboard motor, and the outboard motor can be secured to the backboard 32 in the same manner that the outboard motor is secured to the backboard of a boat.

The arms 16 are provided with upper horizontal flanges 18, and J-shaped bolts 35 extend upwardly from the flanges 18 and engage the frame 11, Figure 4. The apparatus of the present invention may further be provided with chains 36 which can be used for helping to secure the luggage or outboard motor in place so as to prevent the luggage or the like from accidentally working loose, and the chains 36 may be provided with turnbuckles 37 for adjusting the length thereof.

There is further provided a means for maintaining the support members 19 immobile in the adjusted or solid line position shown in Figure 2. This means comprises a body member 38 which may be pivotally connected to each of the fingers 17 through the medium of a pivot pin or bolt 39, and a U-shaped clamp 40 is carried by each of the body members 38. The clamp 40 is provided with apertures which are adapted to register with apertures in the bottom of the support members, and a pin 41 is adapted to be extended through these registering apertures, there being a chain 42 connected to the pin 41 for retaining the pin 41 connected to the structure so that accidental loss of the pin 41 is prevented. When it is desired to move the parts from the solid line position shown in Figure 2 to the broken line position shown in Figure 2, as when access is to be had or gained to the trunk compartment of the vehicle, it is only necessary to remove the pin 41 from the position shown in Figure 8 so that the clamp 40 and body members 38 can be pivoted from the solid line position in Figure 7 to the dotted line position of Figure 7 whereby the support members 19 are free to pivot from the solid line position in Figure 2 to the broken line position in Figure 2.

Spacer members 43 of V-shape may extend between the tops of the arm 16 and the bottom of the frame 11 for helping to steady the arm 16, and the spacer members 43 may be secured in place as by welding. A hollow tube or casing 44 may be secured to the outer surface of each of the support members 19, and the casing 44 is adapted to receive the lower ends of pipes or uprights in the event that a boat is to be supported on the vehicle 10 so that such pipes can provide a support for a portion of the boat. The vehicle includes the usual bumper brace 45.

From the foregoing, it is apparent that there has been provided a structure which can be attached to a vehicle such as the automobile 10 whereby increased loads can be carried by the vehicle. In use, the bar 15 may depend from the frame 11, and the arm 16 may be secured to the bars 15. The lower ends of the support members 19 may be pivotally connected to the arms 16 through the medium of bolts or pivot pins 46. Thus, normally when a load is being transported by the device, the device is in the position shown in Figure 1 or in the solid line position of Figure 2 so that the frame 24 provides a convenient means for storing or transporting various articles such as luggage, or the like. The end board 32 may provide a support for an outboard motor or engine which can be clamped to it in the same manner that an outboard engine is clamped to a boat, and the chains 36 can be used to help steady such an engine or boat. However, when it is desired to gain access to the trunk compartment at the rear of the vehicle 10, the device can be swung from the solid line position shown in Figure 2 to the broken line position shown in Figure 2 whereby the trunk lid can be lifted in the usual manner. To swing the device from the solid line position in Figure 2 to the broken line position of Figure 2, it is only necessary to remove the pins 41 from the position shown in Figure 8 whereby the clamp 40 and body member 38 can be pivoted on the pin 39 so as to permit the support members 19 to pivot on the pivot pins 46. Afterwards when the device is again to be used for supporting the load, the device is moved from the broken line position of Figure 2 to the solid line position of Figure 2 and the clamp 40 and pin 41 are returned to the position shown in Figure 8 so that accidental swinging movement of the support members 19 will be prevented. The J-bolts 35 help to reinforce the device and the spacer members 43 also help to retain the parts in their proper position.

The size and shape of the parts can be varied as desired, and the parts can be made of any suitable material. As shown in Figure 2, the bolts 33 provide a pivotal support for the end boards 32 so that the end board 32 can be shifted from the solid line position of Figure 2 to the broken line position to the left of the solid line position so that the outboard motors of different sizes can be supported thereon. Braces can be provided or used wherever desired or required. The support members 19 can be completely detached from the vehicle when the device is not being used, but parts such as the arm 16 may be retained or secured in place permanently so as to provide reinforcement or added strength for the rear bumper 14. The position of the parts can be easily and quickly shifted or adjusted, and the device can be applied to different makes or models of vehicles. By having the adjustable features of the device, heavy or light outboard motors can be carried and the amount of baggage being carried can be varied. The chains 36 help steady the tail of the motor so as to prevent vibration thereof. The device is neat in appearance, and the pipes 44 may provide a foundation for support members which can be used for helping to support a boat which may be mounted on top of the vehicle 10. Thus, pipes can be screwed into the casings or tubes 44 and a cross bar can be extended between tops of the pipes for helping to support a boat. With the present invention there is no strain or stress on delicate parts of the vehicle since the weight on the luggage carrier has a forward thrust due to the construction and arrangement of the parts.

I claim:

1. In a load supporting structure for mounting on the rear of a vehicle including a frame and a rear bumper, a pair of spaced parallel vertically disposed bars depending from the rear portion of said frame, a horizontally disposed arm extending rearwardly from the lower end of each of said bars and secured thereto, said arms terminating in upstanding fingers, a horizontally disposed flange extending from the upper edge of said arms, a pair of support members having their lower ends pivotally connected to said fingers, said support members each including first portions on the lower end thereof, second portions arranged angularly with respect to said first portions, third portions arranged angularly with respect to said second portions and said third portions arranged at the top of the support members, a rectangular frame extending between said third portions and secured thereto and said frame including a first set of spaced parallel strips and a second set of spaced parallel strips extending at right angles to said first strip, lips extending from said support members, braces extending from said lips, and a back board extending between said braces and secured thereto.

2. The structure as defined in claim 1 and further including casings for supporting uprights.

3. The structure as defined in claim 1 and further including body members pivotally connected to said fingers, a U-shaped clip carried by each of said body members, there being registering apertures in said clips, fingers and support members, pins extending through said registering apertures, and a chain connected to each of said pins.

4. The structure as defined in claim 1 and further including spacer blocks interposed between said frame and arms, and J-bolts extending between said arms and frame.

5. In a load supporting structure for mounting on the rear of a vehicle including a frame and a rear bumper, a pair of spaced parallel vertically disposed bars depending from the rear portion of said frame, a horizontally disposed arm extending rearwardly from the lower end of each of said bars and secured thereto, said arms terminating in upstanding fingers, a horizontally disposed flange extending from the upper edge of said arms, a pair of support members having their lower ends pivotally connected to said fingers, said support members each including first portions on the lower end thereof, second portions arranged angularly with respect to said first portions, third portions arranged angularly with respect to said second portions and said third portions arranged at the top of the support members, said third portions being arranged angularly with respect to each other, a rectangular frame extending between said third portions and secured thereto and said frame including a first set of spaced parallel strips and a second set of spaced parallel strips extending at right angles to said first strips, lips extending from said support members, braces extending from said lips, and a back board extending between said braces and secured thereto, tubular casings for supporting uprights, body members pivotally connected to said fingers and having U-shaped clips connected thereto, there being registering apertures in said clips, fingers and support members, pins extending through said registering apertures, chains connected to said pins, spacer blocks interposed between the frame and arms, J-bolts extending between said arms and frame, and chains for helping to steady an outboard motor mounted on said back board.

References Cited in the file of this patent

UNITED STATES PATENTS

| 2,204,824 | Rock | June 18, 1940 |
| 2,592,050 | McCharen | Apr. 8, 1952 |
| 2,709,545 | Cryer | May 31, 1955 |

FOREIGN PATENTS

| 633,774 | Great Britain | Dec. 30, 1949 |
| 276,016 | Switzerland | Sept. 1, 1951 |